United States Patent
Mills et al.

(10) Patent No.: US 10,452,315 B2
(45) Date of Patent: Oct. 22, 2019

(54) BLOCK PRIORITY INFORMATION

(71) Applicant: HEWLETT PACKARD ENTERPRISE DEVELOPMENT LP, Houston, TX (US)

(72) Inventors: Mark Mills, Fort Collins, CO (US); Kishore Kumar M, Bangalore (IN); Sandya Srivilliputtur Mannarswamy, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 181 days.

(21) Appl. No.: 15/500,001

(22) PCT Filed: Sep. 24, 2014

(86) PCT No.: PCT/US2014/057318
§ 371 (c)(1),
(2) Date: Jan. 27, 2017

(87) PCT Pub. No.: WO2016/048314
PCT Pub. Date: Mar. 31, 2016

(65) Prior Publication Data
US 2017/0242627 A1 Aug. 24, 2017

(51) Int. Cl.
*G06F 3/06* (2006.01)
*G06F 11/10* (2006.01)

(52) U.S. Cl.
CPC ............ *G06F 3/0659* (2013.01); *G06F 3/064* (2013.01); *G06F 3/065* (2013.01); *G06F 3/0617* (2013.01);
(Continued)

(58) Field of Classification Search
CPC ...... G06F 3/0659; G06F 3/0617; G06F 3/064; G06F 3/0643; G06F 3/065; G06F 3/0689;
(Continued)

(56) References Cited

U.S. PATENT DOCUMENTS 5,826,001 A * 10/1998 Lubbers .............. G06F 11/1076
714/6.21
7,024,586 B2 4/2006 Kleiman et al.
(Continued)

FOREIGN PATENT DOCUMENTS

GB 2514810 A * 12/2014 .......... G06F 11/1092

OTHER PUBLICATIONS

Denehy, T.E. et al., "Bridging the Information Gap in Storage Protocol Stacks," (Research Paper), Jun. 10-15, 2002, 15 pps. <https://www.usenix.org/legacy/event/usenix02/full_papers/denehy/denehy.pdf>.

(Continued)

*Primary Examiner* — Michael Krofcheck
(74) *Attorney, Agent, or Firm* — Hewlett Packard Enterprise Patent Department (57) ABSTRACT

Example implementations relate to a storage system. An example implementation includes a storage system including a controller coupled to a storage medium. The controller is to receive block priority information from a file system via a communication agent. The block priority information and the file system are associated with the storage medium. Based on the block priority information, the controller is to selectively perform an operation on the storage medium. The operation includes a reconstruction operation, a data scrubbing operation, and a data migration operation.

21 Claims, 11 Drawing Sheets

(52) U.S. Cl.
CPC .......... *G06F 3/0643* (2013.01); *G06F 3/0689* (2013.01); *G06F 11/1076* (2013.01); *G06F 2211/1059* (2013.01); *G06F 2211/1088* (2013.01)

(58) Field of Classification Search
CPC .... G06F 3/0616; G06F 3/0619; G06F 3/0647; G06F 11/1076; G06F 2211/1059; G06F 2211/1088
See application file for complete search history.

(56) References Cited

U.S. PATENT DOCUMENTS

| | | | |
|---|---|---|---|
| 7,231,412 B2 | 6/2007 | Hitz et al. | |
| 8,086,893 B1* | 12/2011 | MacFarland | G06F 11/1088 714/3 |
| 8,086,911 B1 | 12/2011 | Taylor | |
| 9,037,826 B1* | 5/2015 | Brooker | G11C 7/22 711/167 |
| 2003/0237019 A1 | 12/2003 | Kleiman et al. | |
| 2004/0260967 A1* | 12/2004 | Guha | G06F 11/008 714/3 |
| 2006/0085594 A1 | 4/2006 | Roberson et al. | |
| 2007/0294570 A1 | 12/2007 | Polisetti et al. | |
| 2009/0271659 A1 | 10/2009 | Troppens et al. | |
| 2011/0066803 A1* | 3/2011 | Arakawa | G06F 11/1088 711/114 |
| 2011/0213928 A1* | 9/2011 | Grube | G06F 11/1076 711/E12.103 |
| 2012/0059803 A1* | 3/2012 | Nagpal | G06F 11/1076 707/691 |
| 2012/0117328 A1* | 5/2012 | McKean | G06F 12/0866 711/136 |
| 2014/0365819 A1* | 12/2014 | Cooper | G06F 11/1092 714/6.22 |

OTHER PUBLICATIONS

Appuswamy, R. et al., "Loris—A Dependable, Modular File-Based Storage Stack," (Research Paper), 2010, 10 pps., <http://www.minix3.org/docs/loris/PRDC2010.pdf>.

Xin et al., "Evaluation of Distributed Recovery in Large-Scale Storage Systems" Proceedings. 13th IEEE International Symposium on High performance Distributed Computing, 2004, 10 pages.

Tian et al., "PRO: A Popularity-based Multi-threaded Reconstruction Optimization for RAID-Structured Storage Systems", FAST '07: 5th USENIX Conference on File and Storage Technologies, 2007, pp. 277-290.

Sivathanu et al., "Improving Storage System Availability With D-GRAID", ACM Transactions on Storage, vol. 1, No. 2, May 2005, pp. 133-170.

Lee et al., "Automatic Recovery from Disk Failure in Continuous-Media Servers", IEEE Transactions on Parallel and Distributed Systems, vol. 13, Issue 5, May 2002, pp. 499-515.

International Search Report and Written Opinion received for PCT Patent Application No. PCT/US2014/057318, dated May 26, 2015, 7 pages.

International Preliminary Report on Patentability received for PCT Patent Application No. PCT/US2014/057318, dated Apr. 6, 2017, 6 pages.

Hou et al., "Balancing I/O Response Time and Disk Rebuild Time in a RAID5 Disk Array" Proceedings of the Twenty-sixth Hawaii International Conference on System Sciences, 1993, pp. 70-79.

Holland, Mark Calvin, "On-Line Data Reconstruction in Redundant Disk Arrays", A dissertation submitted to the Department of Electrical and Computer Engineering, Carnegie Mellon University, in partial fulfillment of the requirements for the degree of Doctor of Philosophy, 1994, 254 pages.

Bachmat et al., "Analysis of Methods for Scheduling Low Priority Disk Drive Tasks", Appears in Proceedings of SIGMETRICS 2002 Conference, Jun. 15-19, 2002, 11 pages.

* cited by examiner

BLOCK PRIORITY INFORMATION

BACKGROUND

Reliability and data availability are important aspects of a storage system. An example mechanism to increase reliability and data availability of a data storage system may be to configure storage devices of the storage system as a redundant array of inexpensive disks (RAID).

BRIEF DESCRIPTION OF THE DRAWINGS

Some examples of the present application are described with respect to the following figures.

DETAILED DESCRIPTION

A storage system that implements redundant array of inexpensive disks (RAID) may recover from a storage device, such as a disk drive, failure by reconstructing at least one logical volume of the failed storage device in another storage device. During a reconstruction operation, requests may be sent to the functioning storage devices of a RAID to supply content of the logical volume for the reconstruction operation. Thus, input/output (I/O) loads of the functioning storage devices may be increased. An increased I/O load may increase a likelihood of failure of a storage device.

Examples described herein provide a storage system that includes a controller to exchange information with a file system. For example, a controller may transmit a reconstruction notification to a file system via a communication agent. The controller may receive block priority information from a file system via the communication agent. The controller may selectively perform a reconstruction operation on a logical volume of a first storage device in a second storage device based on the block priority information.

As another example, the controller may determine a first scrubbing frequency and a second scrubbing frequency based on the block priority information, where the second scrubbing frequency is lower than the first scrubbing frequency. The controller may perform a first data scrubbing operation on a first logical block associated with a first block number according to the first scrubbing frequency and perform a second data scrubbing operation on a second logical block associated with a second block number according to the second scrubbing frequency.

As another example, the controller may monitor a reliability parameter of a first storage device of a storage medium. When the reliability parameter exceeds a threshold, the controller may selectively transfer content of the first storage device to a second storage device based on the block priority information. As another example, the controller may transmit the reliability parameter to a file system. The file system may selectively transfer content of the first storage device to a second storage device based on the reliability parameter. In this manner, examples described herein may increase an efficiency of an operation performed by a controller and/or a file system, such as a reconstruction operation, a data scrubbing operation, and a data migration operation.

Figure 1:
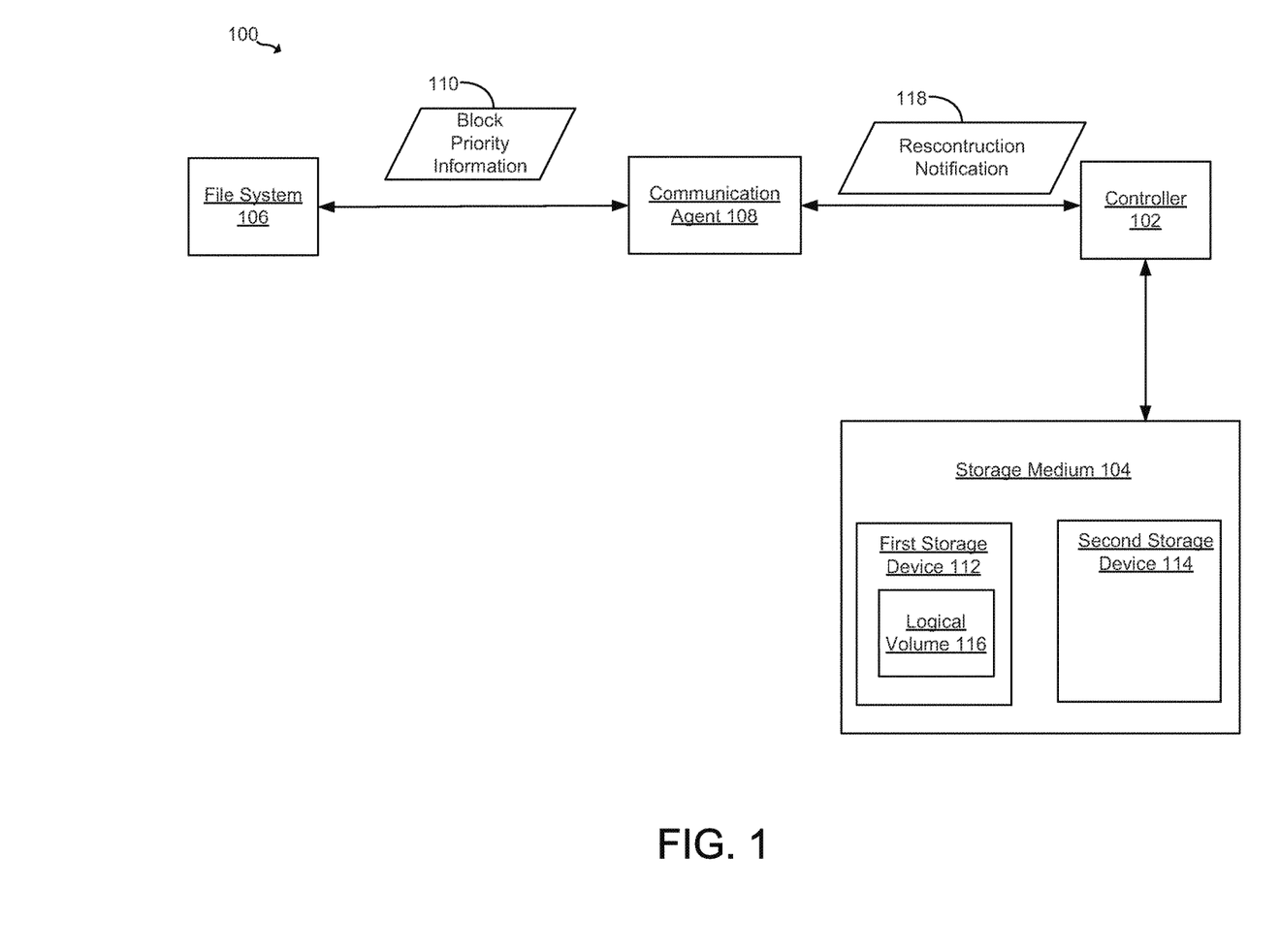
FIG. 1 is a block diagram of a storage system including a controller to exchange information with a file system, according to an example.

Referring now to the figures, FIG. 1 is a block diagram of a storage system 100 including a controller to exchange information with a file system, according to an example. Storage system 100 may include a controller 102, a storage medium 104, and a file system 106. Controller 102 may be a circuit, an electronic device, a computing device suitable to direct an operation of a RAID. Storage medium 104 may be a storage device or a storage array that implements a RAID. In some examples, storage medium 104 may include a plurality of storage devices, such as disk drives, implementing a RAID with block-level stripping with distributed parity (RAID 5). File system 106 may be an application implemented using processor executable instructions that control how data is stored and retrieved. In some examples, file system 106 may be located in storage medium 104.

Storage medium 104 may include a plurality of storage devices, such as first storage device 110 and a second storage device 112. In some examples, storage devices 110-112 may be hard disk drives implementing a RAID. First storage device 110 may include a logical volume 114 associated with file system 106. For example, file system 106 may perform block allocation for logical volume 114.

File system 106 and controller 102 may exchange information via a communication agent 108. Communication agent 108 a set of processor executable instructions suitable to receive information from and transmit information to file system 106 and controller 102. In some examples, communication agent 108 may be located in the user space layer.

File system 106 and controller 102 may exchange information, such as block priority information 116 and/or a notification 118, to increase efficiencies of particular operations. As described in more detail in FIG. 2, controller 102 may perform a reconstruction operation, a data scrubbing operation, and/or a data migration operation based on information received from file system 106. File system 106 may also perform a data migration operation based on information received from controller 102.

Reconstruction Operation

Figure 2:
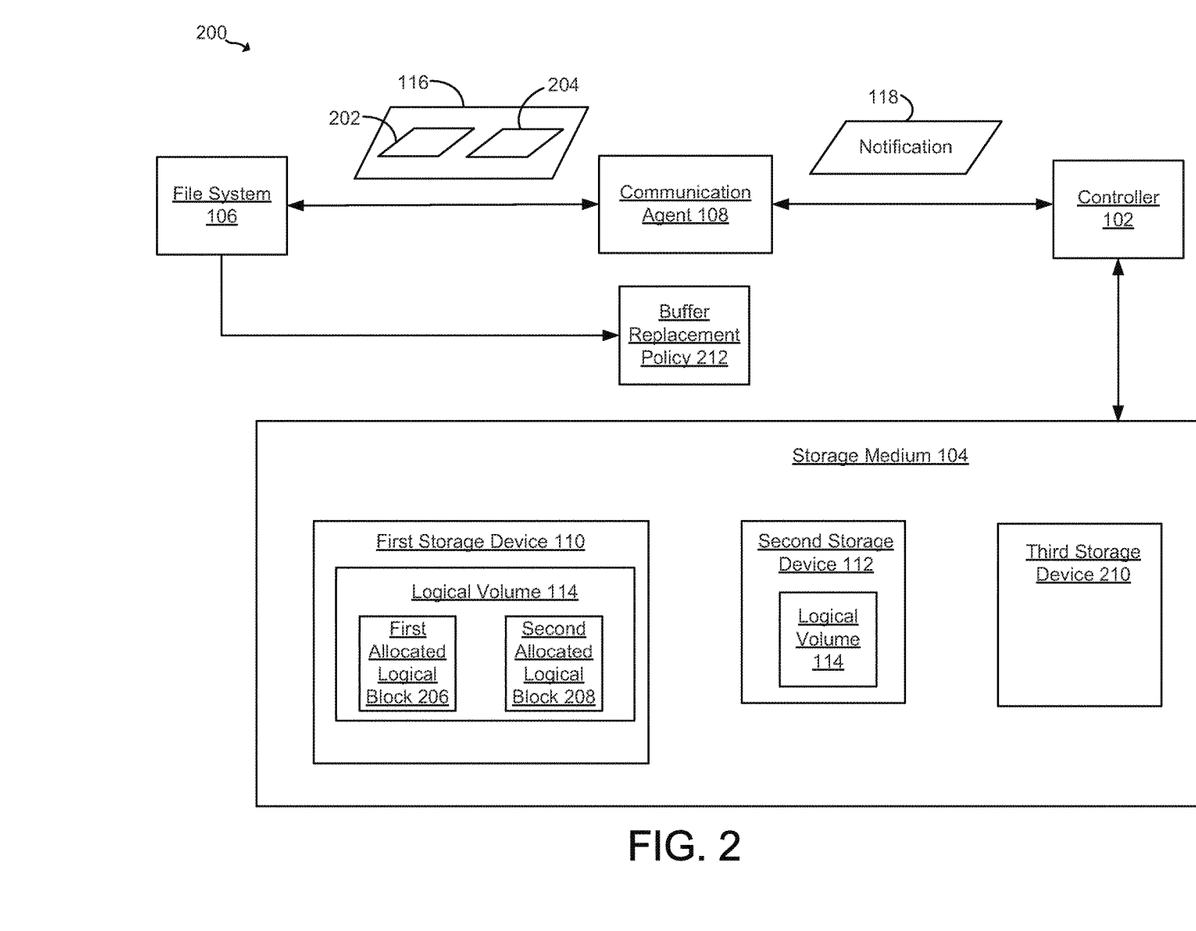
FIG. 2 is a block diagram of a storage system including a controller to exchange information with a file system, according to an example.

Referring to FIG. 2, FIG. 2 is a block diagram of a storage system 200 including controller 102 to exchange information with file system 106, according to an example. In some examples, controller 102 may reconstruct content of a logical volume of a failed disk based on block priority information 116 received from file system 106 via communication agent 108. To illustrate, First storage device 110 may be a failed disk drive and second storage device 112 may be a functional spare disk drive. The failed disk drive and the functional disk drive may be part of a RAID.

Controller 102 may selectively reconstruct content of logical volume 114 in second storage device 112 via a reconstruction operation. When controller 102 initiates the reconstruction operation, controller 102 may transmit notification 118 to communication agent 108. Communication agent 108 may forward notification 118 to file system 106. Notification 118 may be a reconstruction notification informing file system 106 that logical volume 114 is to be rebuilt. Based on notification 118, file system 106 may generate block priority information 116.

Block priority information 116 may include allocated logical block information 202 that is indicative of a distinct allocation status for each logical block of logical volume 114 as identified by file system 106. File system 106 may generate allocated logical block information 202 by recording allocation status of logical blocks of logical volume 114. An allocation status for an allocated logical block may be "allocated" and an allocation status for an unallocated logical block may be "unallocated." Each logical block in allocated logical block information 202 may be identified by a distinct block number or block address.

In some examples, block priority information 116 may also include prioritized content location information 204. Prioritized content location information 204 may be indicative of a distinct priority associated with each allocated logical block of logical volume 114. File system 106 may generate prioritized content location information 204 by recording a distinct priority assigned to each allocated logical block of logical volume 114. For example, first content may be stored to a first allocated logical block 206 of logical volume 114 and second content may be stored to a second allocated logical block 208 of logical volume 114. First allocated logical block 206 may be assigned a first priority based on the first content. Second allocated logical block 208 may be assigned a second priority that is lower than the first priority based on the second content. In prioritized content location information 204, first allocated logical block 206 may be identified by a first block number and second allocated logical block 208 may be identified by a second block number.

File system 106 or an application (i.e., implemented using a set of processor executable instructions) associated with the allocated logical blocks may assign a distinct priority to each allocated logical block based on content. In some examples, the first content may correspond to metadata of file system 106, such as system data. The second content may correspond to non-metadata of file system 106, such as user data. Thus, file system 106 may assign a higher priority to first allocated logical block 206 than second allocated logical block 208 since metadata is more important to the operation of file system 106 than non-metadata. For example, file system 106 may assign a first priority to first allocated logical block 206 and a second priority to second allocated logical block 208 that is lower than the first priority. In some examples, an application may assign a higher priority to an allocated logical block that stores more important data than another allocated logical block that stores less important data.

Thus, after file system 106 generating allocated logical block information 202 based on the allocation status of the allocated logical block and/or content location information 204 based on the priorities assigned to the allocated logical blocks, file system 106 may transmit block priority information 116 to controller 102 via communication agent 108. Controller 102 may use block priority information 116 to selectively perform the reconstruction operation. For example, controller 102 may perform the reconstruction operation on logical blocks of logical volume 114 having the "allocated" allocation status. Controller 102 may skip performing the reconstruction operation on logical blocks of logical volume 114 having the "unallocated" allocation status since the logical blocks having the "unallocated" allocation status hold no meaningful content.

Among the allocated logical blocks having the "allocated" allocation status, controller 102 may perform the reconstruction operation based on the priorities of the allocated logical blocks. For example, controller 102 may perform the reconstruction operation on first allocated logical block 206 having the first priority prior to second allocated logical block 208 since the first priority is higher than the second priority. Thus, when the reconstruction operation is completed, logical volume 114 may be located in second storage device 112.

By reconstructing allocated blocks but not the unallocated blocks during the reconstruction operation, the amount of blocks to be reconstructed may be reduced. Thus, an amount of time associated with a reconstruction operation may be reduced and an I/O load of storage devices supplying content of the logical volume for the reconstruction operation may also be reduced. Further, by prioritizing the reconstruction operation based on priorities of the allocated logical blocks, the reconstruction operation may be performed in a more intelligent manner.

In some examples, in response to receiving notification 118, file system 106 may assign an under reconstruction status to logical volume 114, File system 106 may avoid storing new data to logical volume 114 when logical volume 114 has the under reconstruction status. When controller 102 finishes the reconstruction operation, controller 102 may transmit notify file system 106 of the completion of the reconstruction operation via communication agent 108. File system 106 may change the under reconstruction status of logical volume 114 to a normal status. Thus, file system 106 may resume storing data to logical volume 114.

In some examples, file system 106 may store data to logical volume 114 during the reconstruction operation for a write request initiated by an application, but not other types of I/O requests. In some examples, when logical volume 114 is the single logical volume associated with file system 106, file system 106 may forward a read request or a write request to controller 102, controller 102 may perform the reconstruction operation on a logical block associated with the read request or the write request irrespective of the allocation status of the logical block.

In some examples, controller 102 may notify, via communication agent 108, file system 106 storage devices that are involved in the reconstruction operation. For example, controller 102 may notify file system 106 that second storage device 112 is involved in the reconstruction operation. When file system 106 receives an I/O request, such as a write request, targeting second storage device 112, file system 106 may redirect the I/O request to another storage device that is not involved in the reconstruction operation, such as a third storage device 210. File system 106 may also modify a buffer replacement policy 212 to increase a likelihood of second storage device 112 maintaining an association with a buffer pool. Thus, an I/O load of second storage device 112 during the reconstruction operation may be reduced. In some examples, when file system 106 is notified by controller 102 that second storage device 112 is involved in the reconstruction operation, file system 106 may defer maintenance tasks associated with second storage device 112 until the completion of the reconstruction operation. Thus, an I/O load of second storage device 112 during the reconstruction operation may be reduced.

Data Scrubbing Operation

Still referring to FIG. 2, in some examples, controller 102 may selectively perform a data scrubbing operation based on block priority information 116. A data scrubbing operation may be an operation where an error in content stored in a logical block is identified and fixed. To illustrate, file system 106 may periodically transmit block priority information 116 to controller 102 via communication agent 108. Alternatively, file system 106 may transmit block priority information 116 in response to receiving notification 118. Notification 118 may be a data scrubbing operation notification informing file system 106 that controller 102 is to perform the data scrubbing operation on logical volume 114.

Based on block priority information 116, controller 102 may scrub the allocated logical blocks of logical volume 114 based on priorities of the allocated logical blocks. For example, based on block priority information 116, controller 102 may determine a first scrubbing frequency associated with first allocated logical block 206 and a second scrubbing frequency associated with second allocated logical block 208. The second scrubbing frequency may be lower than the first scrubbing frequency. Controller 102 may perform a data scrubbing operation on first allocated logical block 206 according to the first scrubbing frequency. Controller 102 may perform a data scrubbing operation on second allocated logical block 208 according to the second scrubbing frequency. Thus, a logical block with a higher priority may be scrubbed more often than a logical block with a lower priority. By performing a data scrubbing operation on allocated logical blocks based on priority, the data scrubbing operation may be performed in a more intelligent manner.

Data Migration Operation

Still referring to FIG. 2, in some examples, controller 102 may selectively perform a data migration operation content of a storage device, such as first storage device 110 and second storage device 112, based on block priority information 116. To illustrate, storage devices 110-112 may be hard disk drives of a RAID. Controller 102 may monitor a reliability parameter of first storage device 110 and/or second storage device 112. In some examples, the reliability parameter may include a self-monitoring, analysis and reporting technology (SMART) indicator. For example, the SMART indicator may indicate how likely a storage device is about to fail or malfunction. When a value of the SMART indicator is "threshold exceeded," controller 102 may determine that the storage device has a high likelihood of failure. When the value of the SMART indicator is "threshold not exceeded," controller 102 may determine that the storage device has a low likelihood of failure.

In some examples, the reliability parameter may include an input/output (I/O) request failure counter associated with first storage device 110 and/or second storage device 112. For example, every time a storage device fails to complete an I/O request, a value of the I/O request failure counter associated with the storage device may be increased by 1. Thus, when a reliability parameter of a storage device exceeds a threshold, such as when the value of the SMART indicator is "threshold exceeded" or when the value of the I/O request failure counter exceeds a particular amount, controller 102 may perform a data migration operation on the storage device.

As an example, controller 102 may determine that a reliability parameter of first storage device 110 exceeds a threshold. Thus, controller 102 may perform a data migration operation on content of first storage device 110, such as logical volume 114, based on block priority information 116.

Based on allocated logical block information 202, controller 102 may transfer or migrate logical blocks of logical volume 114 that have the "allocated" allocation status, such as first allocated logical block 206 and second allocated logical block 208, to second storage device 112. When a logical block of logical volume 114 has the "unallocated" allocation status, controller 102 may skip performing the data migration on the logical block.

In some examples, based on prioritized content location information 204 and based on allocated logical block information 202, controller 102 may selectively transfer the allocated logical blocks. For example, controller 102 may transfer first allocated logical block 206 to second storage device 112 prior to second allocated logical block 208. Thus, by transferring allocated blocks based on priority and not transferring the unallocated blocks during a data migration operation, the data migration operation may be performed in a more intelligent manner.

In some examples, file system 106 may perform the data scrubbing operation instead of controller 102. For example, when the reliability parameter of first storage device 110 exceeds the threshold, controller 102 may include identification information of first storage device 110 in notification 118 and transmit notification 118 to file system 106 via communication agent 108. Based on the identification information in notification 118 and/or based on block priority information 116, file system 106 may perform the data migration operation on logical volume 114.

Figure 3:
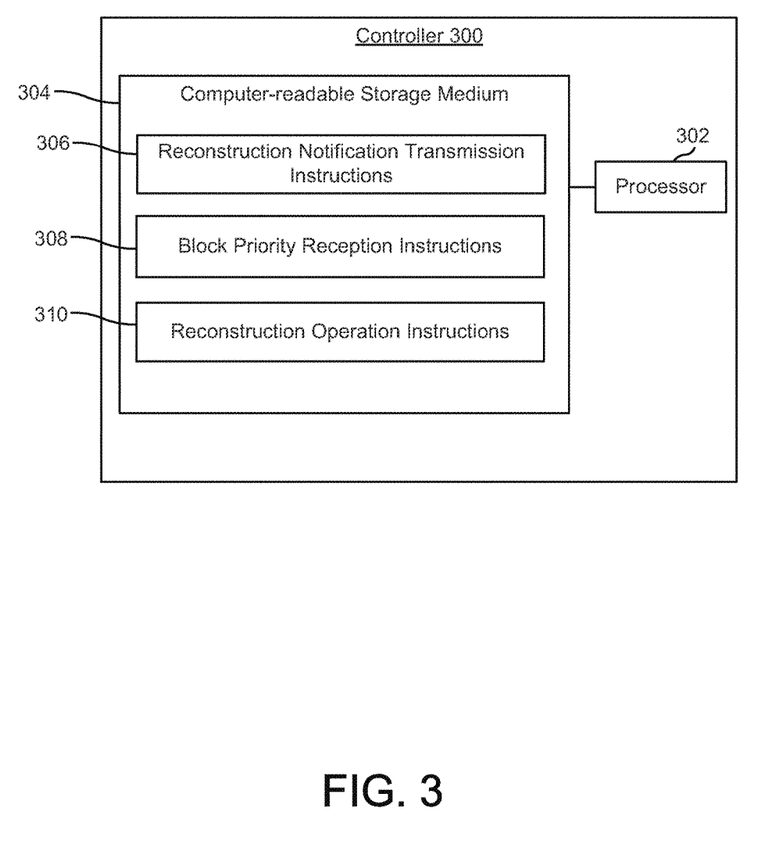
FIG. 3 is a block diagram of a controller of a storage system, according to an example.

FIG. 3 is a block diagram of a controller 300 of a storage system, according to an example. Controller 300 may implement controller 102 of FIGS. 1-2. Controller 300 may include a processor 302 and a computer-readable storage medium 304.

Processor 302 may be a central processing unit (CPU), a semiconductor-based microprocessor, and/or other hardware devices suitable for retrieval and execution of instructions stored in computer-readable storage medium 304. Processor 302 may fetch, decode, and execute instructions 306-310 to control a process of performing a reconstruction operation based on block priority information, such as block priority information 116 of FIGS. 1-2. As an alternative or in addition to retrieving and executing instructions, processor 302 may include at least one electronic circuit that includes electronic components for performing the functionality of instructions encoded in computer-readable storage medium 304, such as instructions 306, 308, 310, or a combination thereof.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions, such as instructions 306-310 for performing a reconstruction operation based on block priority information.

Reconstruction notification transmission instructions 306 may transmit notification 108 from controller 102 to file system 106 via communication agent 108. Block priority reception instructions 308 may receive block priority information 116 from file system 106 via communication agent 108. Reconstruction operation instructions 310 may perform a reconstruction operation on logical volume 114 based on block priority information 116.

Figure 4:
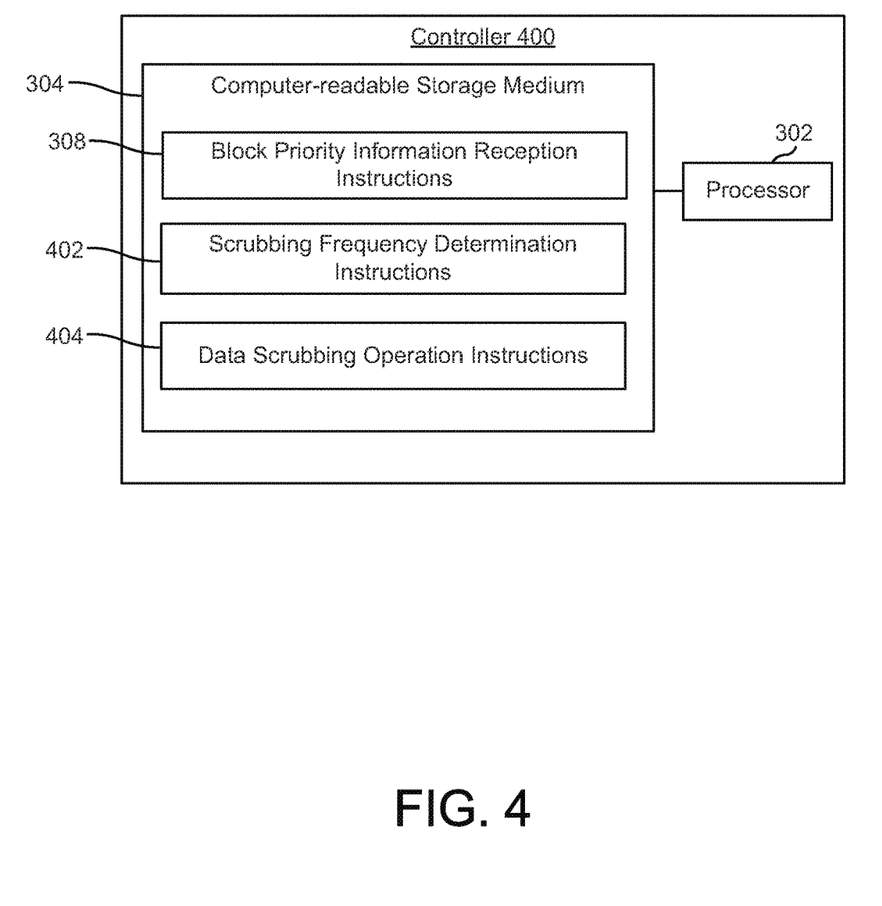
FIG. 4 is a block diagram of a controller of a storage system, according to an example.

FIG. 4 is a block diagram of a controller 400 of a storage system, according to an example. Controller 400 may implement controller 102 of FIGS. 1-2. Controller 400 may include processor 302 and computer-readable storage medium 304. Computer-readable storage medium 304 may be encoded with a series of instructions 308 and 402-404.

Scrubbing frequency determination instructions 402 may determine a scrubbing frequency associated with an allocated logical block, such as first allocated logical block 206, based on a priority of the allocated logical block. Data scrubbing operations 404 may perform a data scrubbing operation on an allocated logical block, such as first allocated logical block 206, based on a scrubbing frequency.

Figure 5:
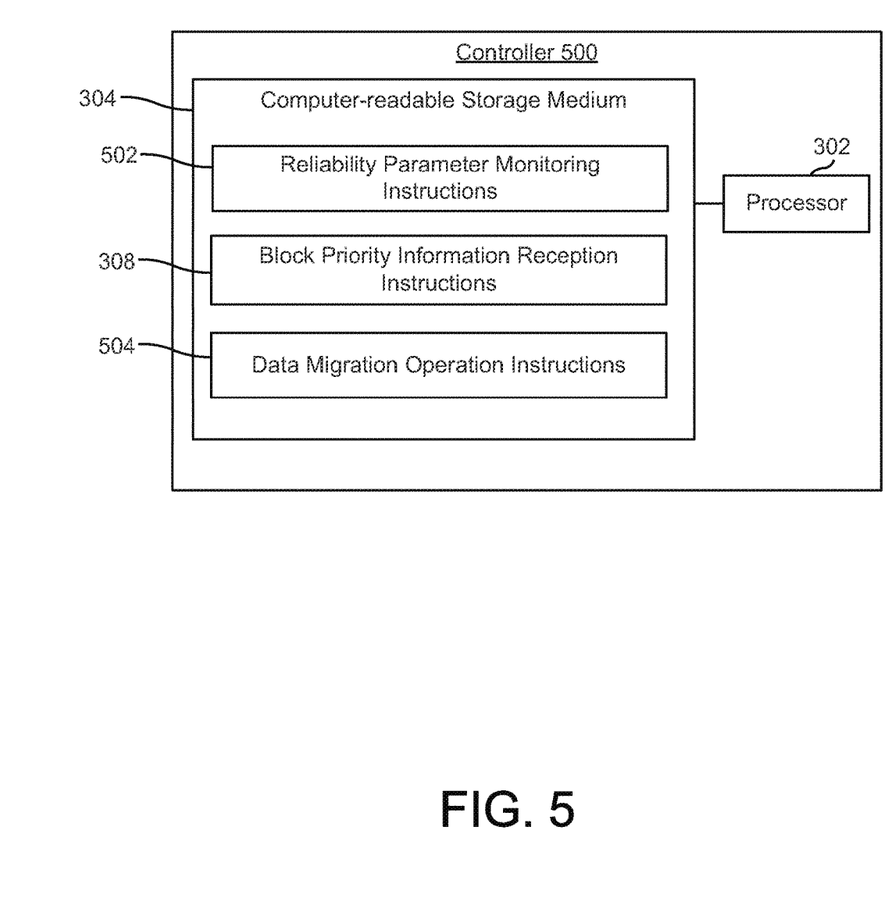
FIG. 5 is a block diagram of a controller of a storage system, according to an example.

FIG. 5 is a block diagram of a controller 500 of a storage system, according to an example. Controller 500 may include processor 302 and computer-readable storage medium 304. Computer-readable storage medium 304 may be encoded with a series of instructions 308 and 502-504. Reliability parameter monitoring instructions 502 may monitor a reliability parameter of a storage device, such as first storage device 110. Data migration operation instructions 504 may perform a data migration operation on a storage device having a reliability parameter that exceeds a threshold, such as first storage device 110.

Figure 6:
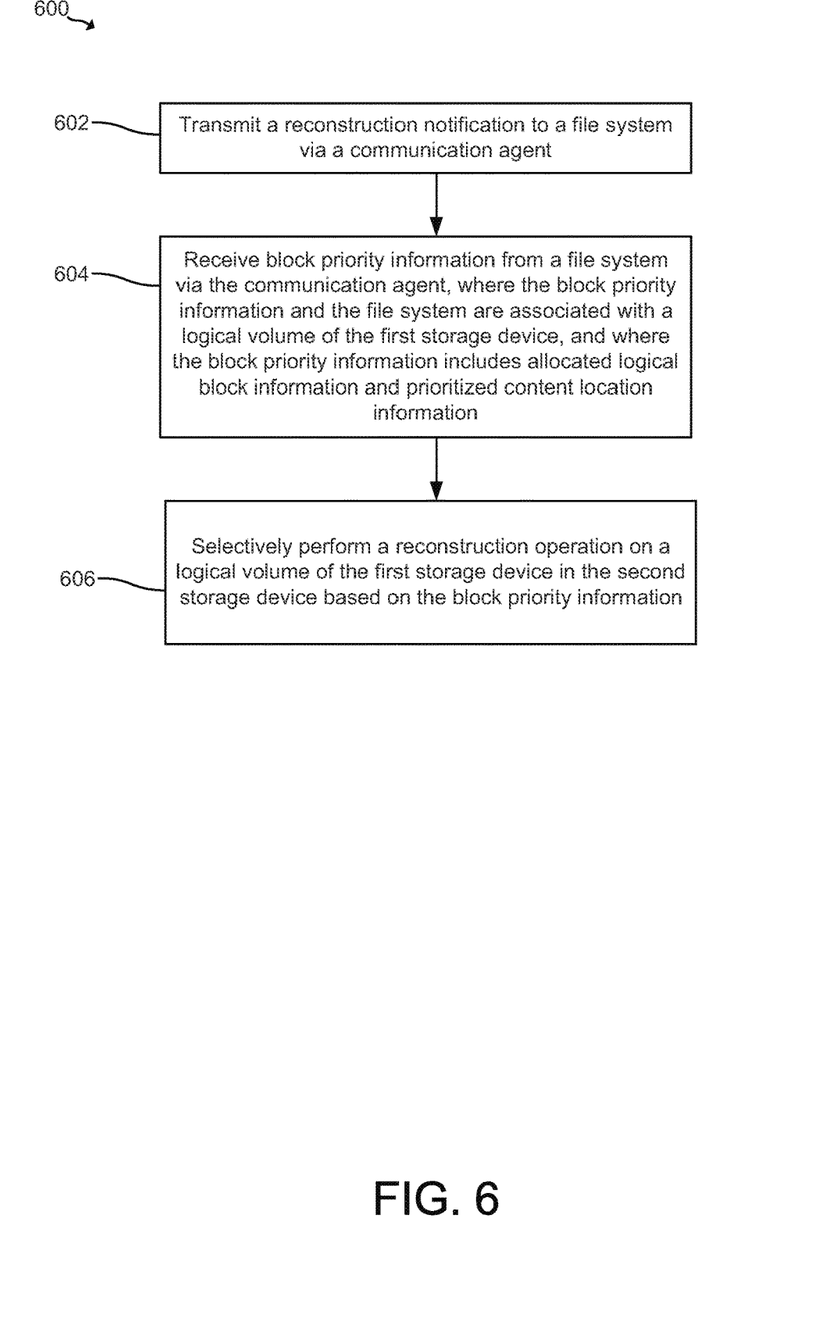
FIG. 6 is a flowchart illustrating a method of a controller performing a reconstruction operation, according to an example.

FIG. 6 is a flowchart illustrating a method 600 of a controller performing a reconstruction operation, according to an example. Method 600 may be implemented using controller 102 of FIGS. 1-2 and controller 300 of FIG. 3. Method 600 includes transmitting a reconstruction notification to a file system via a communication agent, at 602. For example, referring to FIG. 2, controller 102 may transmit notification 118 to file system 106 via communication agent 108.

Method 600 also includes receiving block priority information from a file system via the communication agent, where the block priority information and the file system are associated with a logical volume of the first storage device, and where the block priority information includes allocated logical block information and prioritized content location information, at 604. For example, referring to FIG. 2, controller 102 may receive block priority information 116 from file system 106 via communication agent 108.

Method 600 further includes selectively performing a reconstruction operation on a logical volume of the first storage device in the second storage device based on the block priority information, at 606. For example, referring to FIG. 2, controller 102 may perform the reconstruction operation on logical blocks of logical volume 114 having the "allocated" allocation status. Controller 102 may skip performing the reconstruction operation on logical blocks of logical volume 114 having the "unallocated" allocation status since the logical blocks having the "unallocated" allocation status hold no meaningful content.

Figure 7:
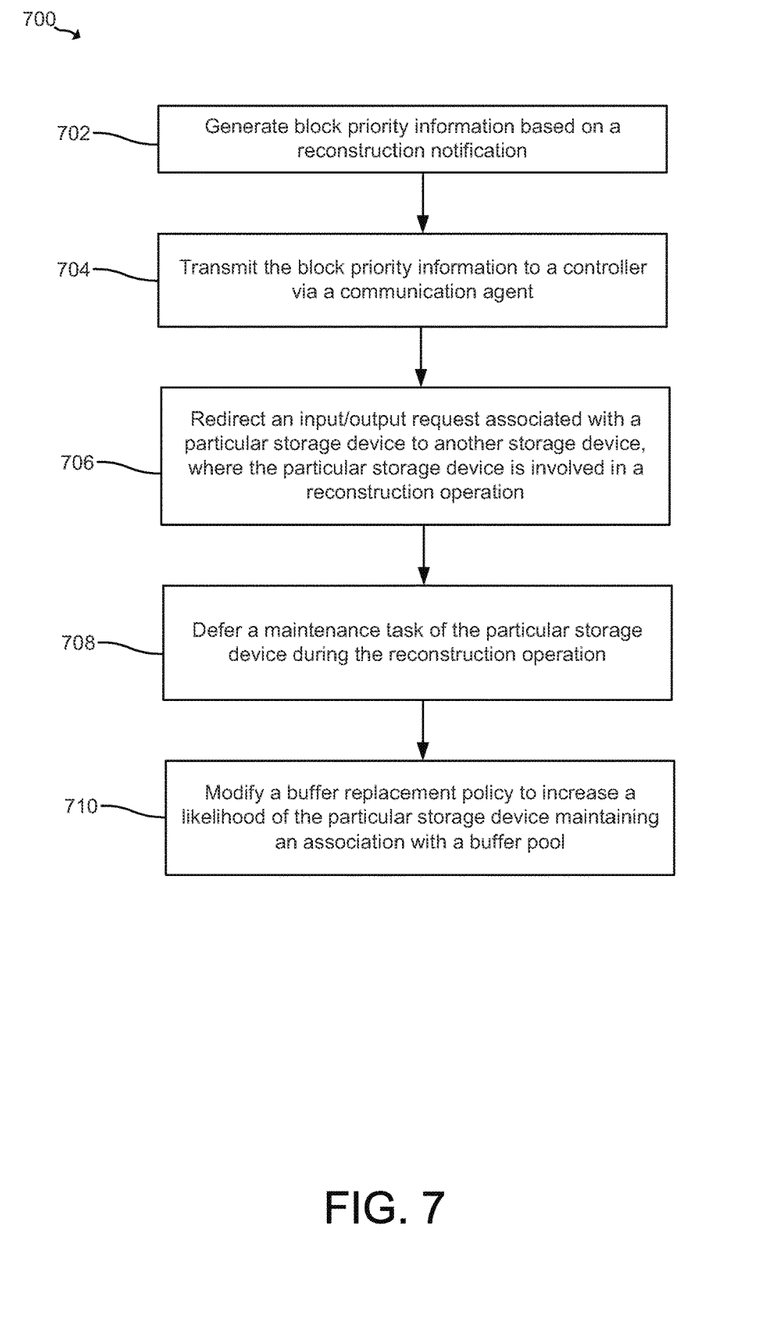
FIG. 7 is a flowchart of illustrating actions of a file system during a reconstruction operation, according to an example.

FIG. 7 is a flowchart illustrating actions of a file system during a reconstruction operation, according to an example.

The actions may be implemented by file system 106 of FIGS. 1-2. At 702, file system 106 may generate block priority information based on a reconstruction notification. For example, referring to FIG. 2, based on notification 118, file system 106 may generate block priority information 116.

At 704, file system 106 may transmit the block priority information to a controller via a communication agent. For example, referring to FIG. 2, file system 106 may transmit block priority information 116 to controller 102 via communication agent 108. At 706, file system 106 may redirect an input/output request associated with a particular storage device to another storage device, where the particular storage device is involved in a reconstruction operation. For example referring to FIG. 2, when file system 106 receives an I/O request, such as a write request, targeting second storage device 112, file system 106 may redirect the I/O request to another storage device that is not involved in the reconstruction operation, such as a third storage device 210.

At 708, file system 106 may defer a maintenance task of the particular storage device during the reconstruction operation. For example, referring to FIG. 2, file system 106 may defer maintenance tasks associated with second storage device 112 until the completion of the reconstruction operation. At 710, file system 106 may modify a buffer replacement policy to increase a likelihood of the particular storage device maintaining an association with a buffer pool. For example, referring to FIG. 2, file system 106 may modify a buffer replacement policy 212 to increase a likelihood of second storage device 112 maintaining an association with a buffer pool.

Figure 8:
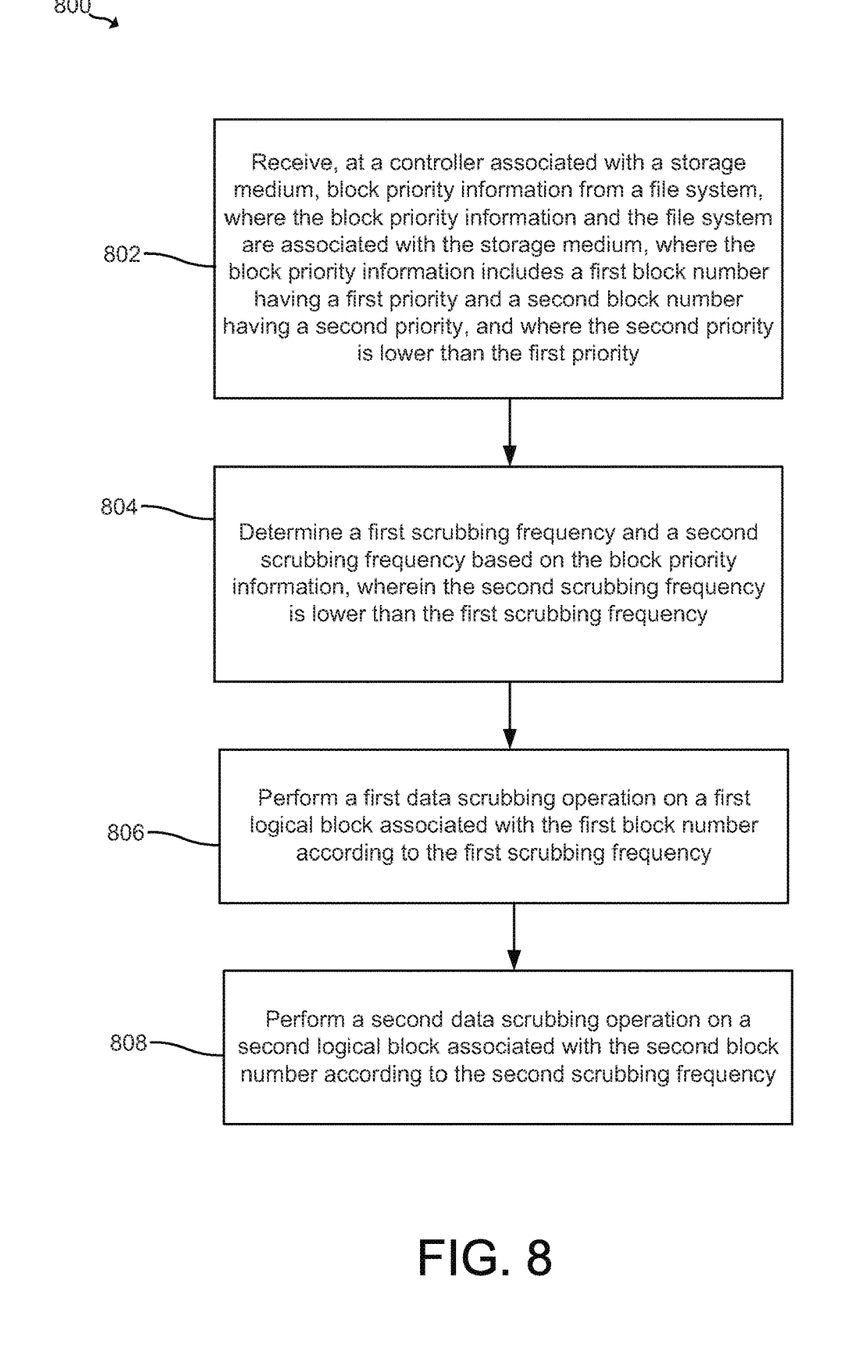
FIG. 8 is a flowchart illustrating a method of a controller performing a data scrubbing operation, according to an example.

FIG. 8 is a flowchart illustrating a method 800 of a controller performing a data scrubbing operation, according to an example. Method 800 may be implemented using controller 102 of FIGS. 1-2 and controller 400 of FIG. 4. Method 800 includes receiving, at a controller associated with a storage medium, block priority information from a file system, where the block priority information and the file system are associated with the storage medium, where the block priority information includes a first block number having a first priority and a second block number having a second priority, and where the second priority is lower than the first priority, at 802. For example, referring to FIG. 2, controller 102 may receive block priority information 116 from file system 106 via communication agent 108.

Method 800 also includes determining a first scrubbing frequency and a second scrubbing frequency based on the block priority information, where the second scrubbing frequency is lower than the first scrubbing frequency, at 804. For example, referring to FIG. 2, controller 102 may determine the first scrubbing frequency and the second scrubbing frequency.

Method 800 further includes performing a first data scrubbing operation on a first logical block associated with the first block number according to the first scrubbing frequency, at 806, For example, referring to FIG. 2, controller 102 may perform a data scrubbing operation on first allocated logical block 206 according to the first scrubbing frequency.

Method 800 further includes performing a second data scrubbing operation on a second logical block associated with the second block number according to the second scrubbing frequency, at 808. For example, referring to FIG. 2, controller 102 may perform a data scrubbing operation on second allocated logical block 208 according to the second scrubbing frequency.

Figure 9:
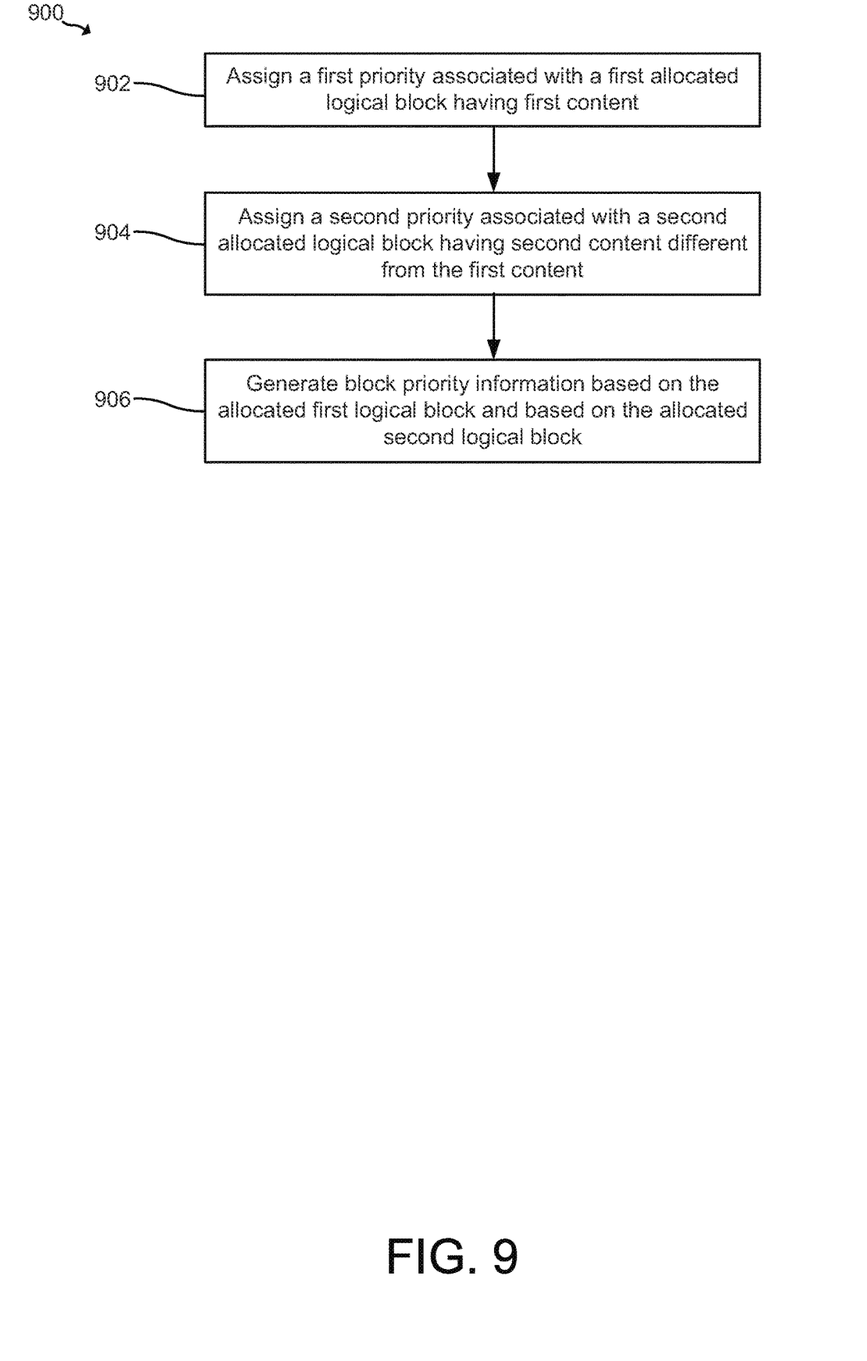
FIG. 9 is a flowchart illustrating a method of a file system generating block priority information, according to an example.

FIG. 9 is a flowchart illustrating a method 900 of a file system generating block priority information, according to an example. Method 900 may be implemented using file system 106 of FIGS. 1-2. Method 900 includes assigning a first priority associated with a first allocated logical block having first content, at 902. For example, referring to FIG. 2, file system 106 may assign the first priority to first allocated logical block 206.

Method 900 also includes assigning a second priority associated with a second allocated logical block having second content different from the first content, at 904. For example, referring to FIG. 2, file system 106 may assign a second priority to second allocated logical block 208 that is lower than the first priority. Method 900 further includes generating block priority information based on the allocated first logical block and based on the allocated second logical block, at 906. For example, file system 106 may generate prioritized content location information 204 by recording a distinct priority assigned to each allocated logical block of logical volume 114.

Figure 10:
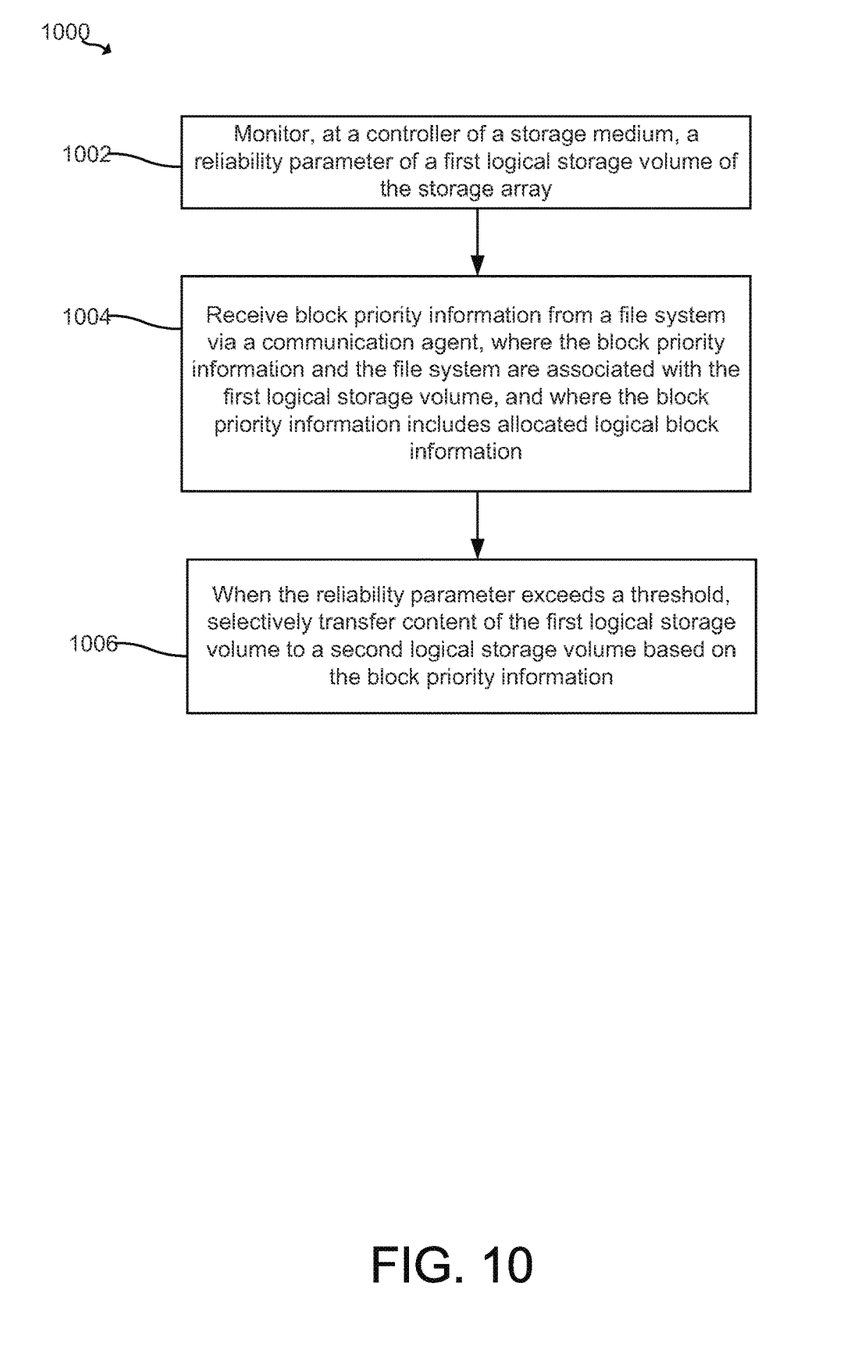
FIG. 10 is a flowchart illustrating a method of a controller performing a data migration operation, according to an example.

FIG. 10 is a flowchart illustrating a method 1000 of a controller performing a data migration operation, according to an example. Method 1000 may be implemented by controller 102 of FIGS. 1-2 and controller 500 of FIG. 5. Method 1000 includes monitoring a reliability parameter of a first storage device of a storage medium, at 1002. For example, referring to FIG. 2, controller 102 may monitor a reliability parameter of first storage device 110 and/or second storage device 112.

Method 1000 also includes receiving block priority information from a file system via a communication agent, where the block priority information and the file system are associated with the first storage device, and where the block priority information includes allocated logical block information, at 1004. For example, referring to FIG. 2, controller 102 may receive block priority information 116 from file system 106 via communication agent 108.

Method 1000 further includes, when the reliability parameter exceeds a threshold, selectively transferring content of the first storage device to a second storage device based on the block priority information, at 1006. For example, referring to FIG. 2, controller 102 may transfer first allocated logical block 206 to second storage device 112 prior to second allocated logical block 208.

Figure 11:
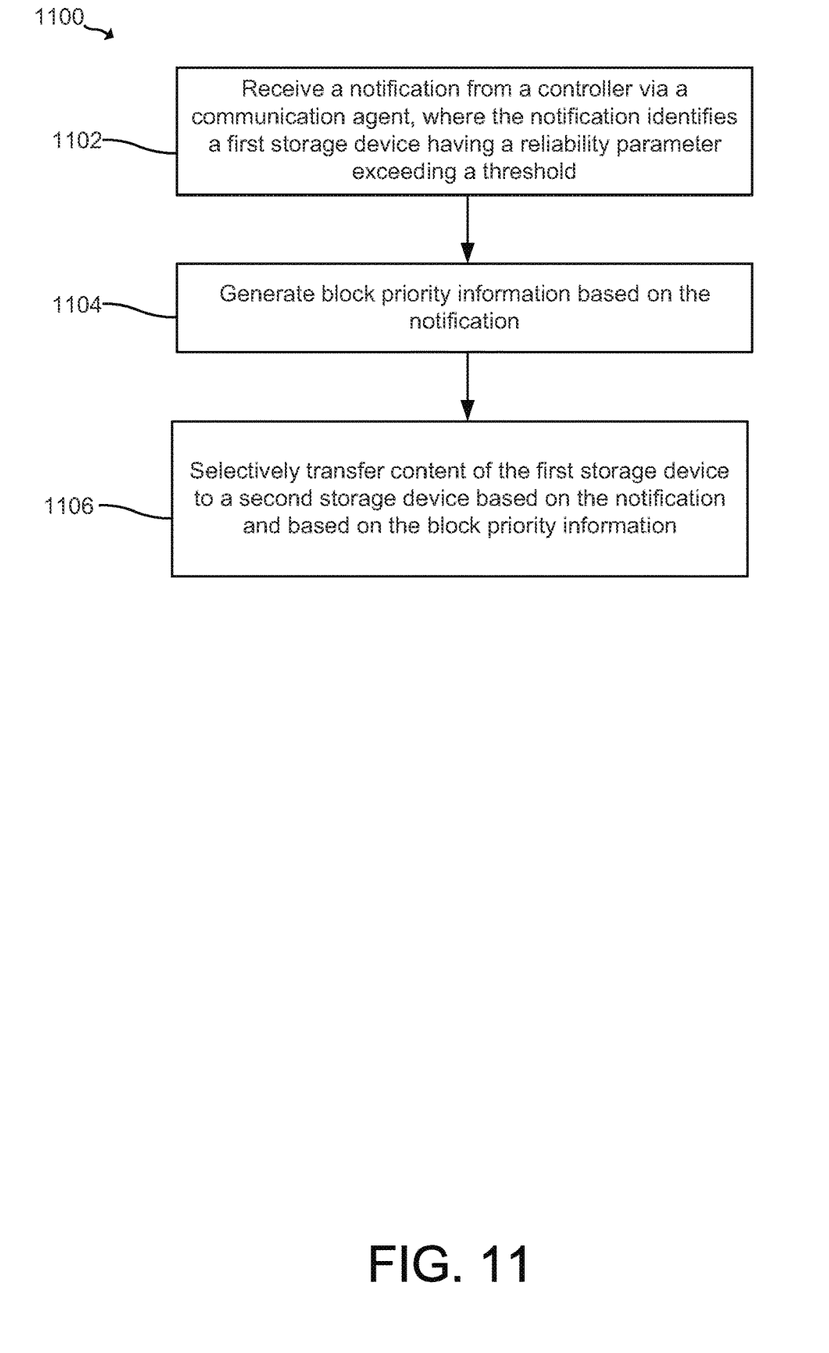
FIG. 11 is a flowchart illustrating a method of a file system performing a data migration operation, according to an example.

FIG. 11 is a flowchart illustrating a method 1100 of a file system performing a data migration operation, according to an example. Method 1100 may be implemented by file system 106 of FIGS. 1-2. Method 1100 includes receiving a notification from a controller via a communication agent, where the notification identifies a first storage device having a reliability parameter exceeding a threshold, at 1102. For example, referring to FIG. 2, file system 106 may receive notification 118 from controller 102 via communication agent 108. Controller 102 may include identification information of first storage device 110 in notification 118 when the reliability parameter of first storage device 110 exceeds the threshold.

Method 1100 also includes generating block priority information based on the notification, at 1104. For example, referring to FIG. 2, based on notification 118, file system 106 may generate block priority information 116. Method 1100 further includes selectively transferring content of the first storage device to a second storage device based on the notification and based on the block priority information, at 1106. For example, based on the identification information in notification 118 and/or based on block priority information 116, file system 106 may perform the data migration operation on logical volume 104.

According to the foregoing, examples disclosed herein provide a storage system that includes a controller to exchange information with a file system. For example, the controller may transmit a reconstruction notification, information on a storage device that is involved in a reconstruction operation, information on a storage device that is about to fail, etc. to the file system via a communication agent. The file system may transmit block priority information to the controller. Controller may perform a reconstruction operation, a data scrubbing operation, and/or a data migration operation based on the block priority information. The file system may perform a data migration operation based on information from the controller, such as the information on a storage device that is about to fail. Thus, by exchanging information between the controller and the file system, an efficiency of an operation performed by the controller and/or the file system, such as the reconstruction operation, the data scrubbing operation, and the data migration operation, may be increased.

The use of "comprising", "including" or "having" are synonymous and variations thereof herein are meant to be inclusive or open-ended and do not exclude additional unrecited elements or method steps.

What is claimed is:

1. A storage system comprising:
   a controller; and
   a storage medium coupled to the controller, wherein the storage medium includes a first storage device and a second storage device, and wherein the controller is to:
   transmit a reconstruction notification to a file system via a communication agent;
   receive block priority information from the file system via the communication agent, wherein the block priority information and the file system are associated with a logical volume of the first storage device, and wherein the block priority information includes allocated logical block information and prioritized content location information; and
   selectively perform a reconstruction operation on the logical volume of the first storage device, the reconstruction operation comprises reconstructing the logical volume in the second storage device based on the block priority information;
   wherein a buffer replacement policy is to be modified by the file system to increase a likelihood of the second storage device maintaining an association with a buffer pool during the reconstruction operation.

2. The storage system of claim 1, wherein the allocated logical block information is indicative of an allocation status of a logical block in the logical volume, and wherein the allocation status includes allocated and unallocated.

3. The storage system of claim 2, wherein when the allocation status is allocated, the controller is to perform the reconstruction operation on the logical block, and wherein the allocation status is unallocated, the controller is to skip the reconstruction operation on the logical block.

4. The storage system of claim 1, wherein the logical volume includes a first allocated logical block and a second allocated logical block, wherein the first allocated logical block includes first content having a first priority, wherein the second allocated logical block includes second content having a second priority that is lower than the first priority, and wherein the prioritized content location information includes a first block number associated with the first allocated logical block and a second block number associated with the second allocated logical block.

5. The storage system of claim 4, wherein the first content corresponds to metadata of the file system, and wherein the second content corresponds to non-metadata of the file system.

6. The storage system of claim 5, wherein the controller is to perform the reconstruction operation on the first allocated logical block prior to the second allocated logical block.

7. The storage system of claim 1, wherein the storage medium further includes a third storage device, and wherein the controller is to redirect an input/output (I/O) request associated with the second storage device to the third storage device during the reconstruction operation.

8. The storage system of claim 1, wherein the block priority information further includes a first block number having a first priority and a second block number having a second priority, wherein the second priority is lower than the first priority, and wherein the controller is further to:
    determine a first scrubbing frequency and a second scrubbing frequency based on the block priority information, wherein the second scrubbing frequency is lower than the first scrubbing frequency;
    perform a first data scrubbing operation on a first logical block associated with the first block number according to the first scrubbing frequency; and
    perform a second data scrubbing operation on a second logical block associated with the second block number according to the second scrubbing frequency;
    wherein the first priority is determined based on content of the first logical block.

9. The system of claim 1, wherein the control is further to:
    monitor a reliability parameter of the first storage device of the storage medium; and
    when the reliability parameter exceeds a threshold, selectively transfer content of the first storage device to the second storage device based on the block priority information.

10. The system of claim 9, wherein the allocation logical block information is indicative of an allocation status of a logical block in the first storage device, wherein the allocation status includes allocated and unallocated, and wherein the controller is further to:
    when the allocation status is allocated, transfer content of the logical block to the second storage device; and
    when the allocation status is unallocated, skip transferring the content of the logical block to the second storage device.

11. A non-transitory computer-readable storage medium comprising instructions that when executed cause a controller of a storage system to:
    transmit a reconstruction notification to a file system via a communication agent;
    receive block priority information from the file system via the communication agent, wherein the block priority information and the file system are associated with a logical volume of a first storage device of the storage system, and wherein the block priority information includes allocated logical block information and prioritized content location information; and
    selectively perform a reconstruction operation on a logical volume of the first storage device, the reconstruction operation comprising reconstructing the logical volume in the second storage device based on the block priority information;
    wherein a buffer replacement policy is to be modified by the file system to increase a likelihood of the second storage device maintaining an association with a buffer pool during the reconstruction operation.

12. The non-transitory computer-readable storage medium of claim 11, wherein the allocated logical block information is indicative of an allocation status of a logical block in the logical volume, and wherein the allocation status includes allocated and unallocated.

13. The non-transitory computer-readable medium of claim 12, wherein the instructions when executed further cause the controller of the storage system to:
    when the allocation status is allocated, perform the reconstruction operation on the logical block; and
    when the allocation status is unallocated, skip the reconstruction operation on the logical block.

14. The non-transitory computer-readable medium of claim 11, wherein the logical volume includes a first allocated logical block and a second allocated logical block, wherein the first allocated logical block includes first content having a first priority, wherein the second allocated logical block includes second content having a second priority that is lower than the first priority, and wherein the prioritized content location information includes a first block number associated with the first allocated logical block and a second block number associated with the second allocated logical block.

15. The non-transitory computer-readable medium of claim 14, wherein the instructions when executed further cause the controller of the storage system to perform the reconstruction operation on the first allocated logical block prior to the second allocated logical block.

16. The non-transitory computer-readable medium of claim 11, wherein the prioritized content location information includes a first block number associated with a first logical block and a second block number associated with a second logical block,
    wherein the instructions when executed further cause the controller of the storage system to:
        determine a first scrubbing frequency and a second scrubbing frequency based on the block priority information, wherein the second scrubbing frequency is lower than the first scrubbing frequency;
        perform a first data scrubbing operation on a first logical block associated with the first block number according to the first scrubbing frequency; and
        perform a second data scrubbing operation on a second logical block associated with the second block number according to the second scrubbing frequency; and
    wherein the first priority is determined based on content of the first logical block.

17. The non-transitory computer-readable medium of claim 11, wherein the instructions when executed further cause the controller of the storage system to:
    monitor a reliability parameter of the first storage device of the storage system; and
    when the reliability parameter exceeds a threshold, selectively transfer content of the first storage device to the second storage device based on the block priority information.

18. A method, comprising:
    transmit, by a controller associated with a storage medium, a reconstruction notification to a file system via a communication agent;
    receive, at the controller, block priority information from the file system via the communication agent, wherein the block priority information and the file system are associated with a logical volume of a first storage device, and wherein the block priority information includes allocated logical block information and prioritized content location information; and selectively perform, by the controller, a reconstruction operation on the logical volume of the first storage device, the reconstruction operation comprises reconstructing the logical volume in the second storage device based on the block priority information;

wherein a buffer replacement policy is to be modified by the file system to increase a likelihood of the second storage device maintaining an association with a buffer pool during the reconstruction operation.

19. The method of claim 18, wherein the logical volume includes a first allocated logical block and a second allocated logical block, wherein the first allocated logical block includes first content having a first priority, wherein the second allocated logical block includes second content having a second priority that is lower than the first priority, wherein the prioritized content location information includes a first block number associated with the first allocated logical block and a second block number associated with the second allocated logical block, wherein the first content corresponds to metadata of the file system, and wherein the second content corresponds to non-metadata of the file system, the method further comprising:

performing, by the controller, the reconstruction operation on the first allocated logical block prior to the second allocated logical block.

20. The method of claim 18, wherein the block priority information includes a first block number associated with a first logical block and a second block number associated with a second logical block, the method further comprising:

determining, by the controller, a first scrubbing frequency and a second scrubbing frequency based on the block priority information, wherein the second scrubbing frequency is lower than the first scrubbing frequency;

performing, by the controller, a first data scrubbing operation on a first logical block associated with the first block number according to the first scrubbing frequency; and performing, by the controller, a second data scrubbing operation on a second logical block associated with the second block number according to the second scrubbing frequency.

21. The method of claim 18, further comprising:

monitoring, by the controller, a reliability parameter of the first storage device of the storage medium; and when the reliability parameter exceeds a threshold, selectively transfer, by the controller, content of the first storage device to the second storage device based on the block priority information.

* * * * *